Nov. 9, 1926.
B. E. AURELIUS
1,606,684
BEATER
Filed March 10, 1926    2 Sheets-Sheet 1
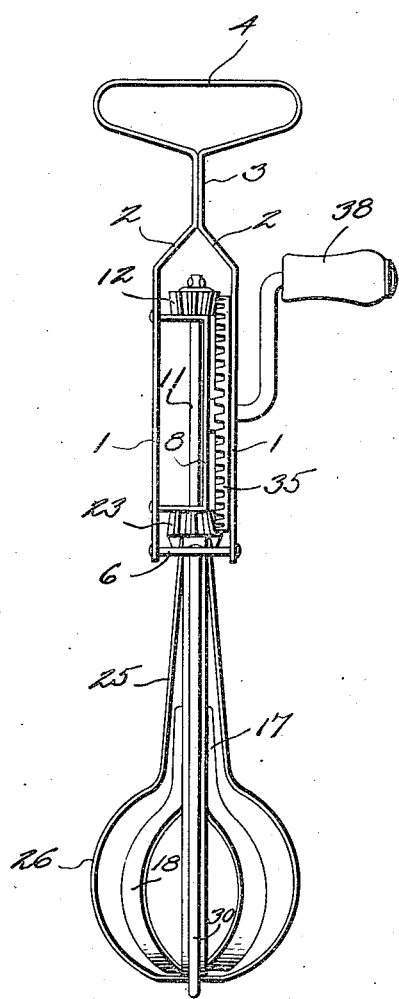
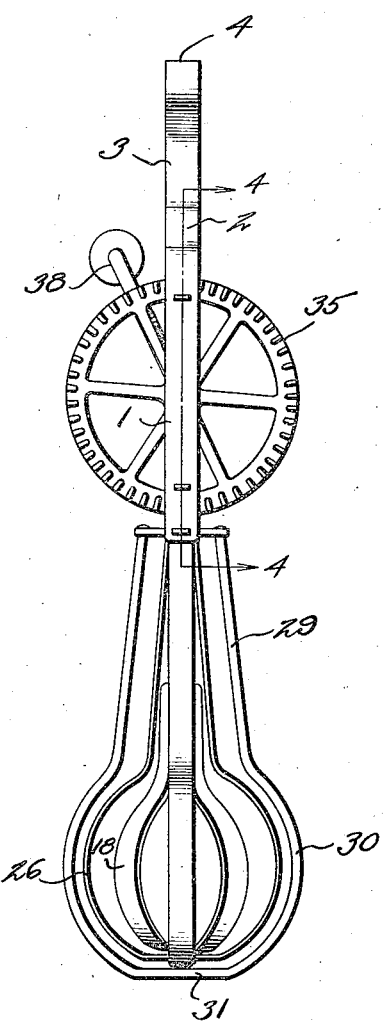
Bernard E. Aurelius
INVENTOR

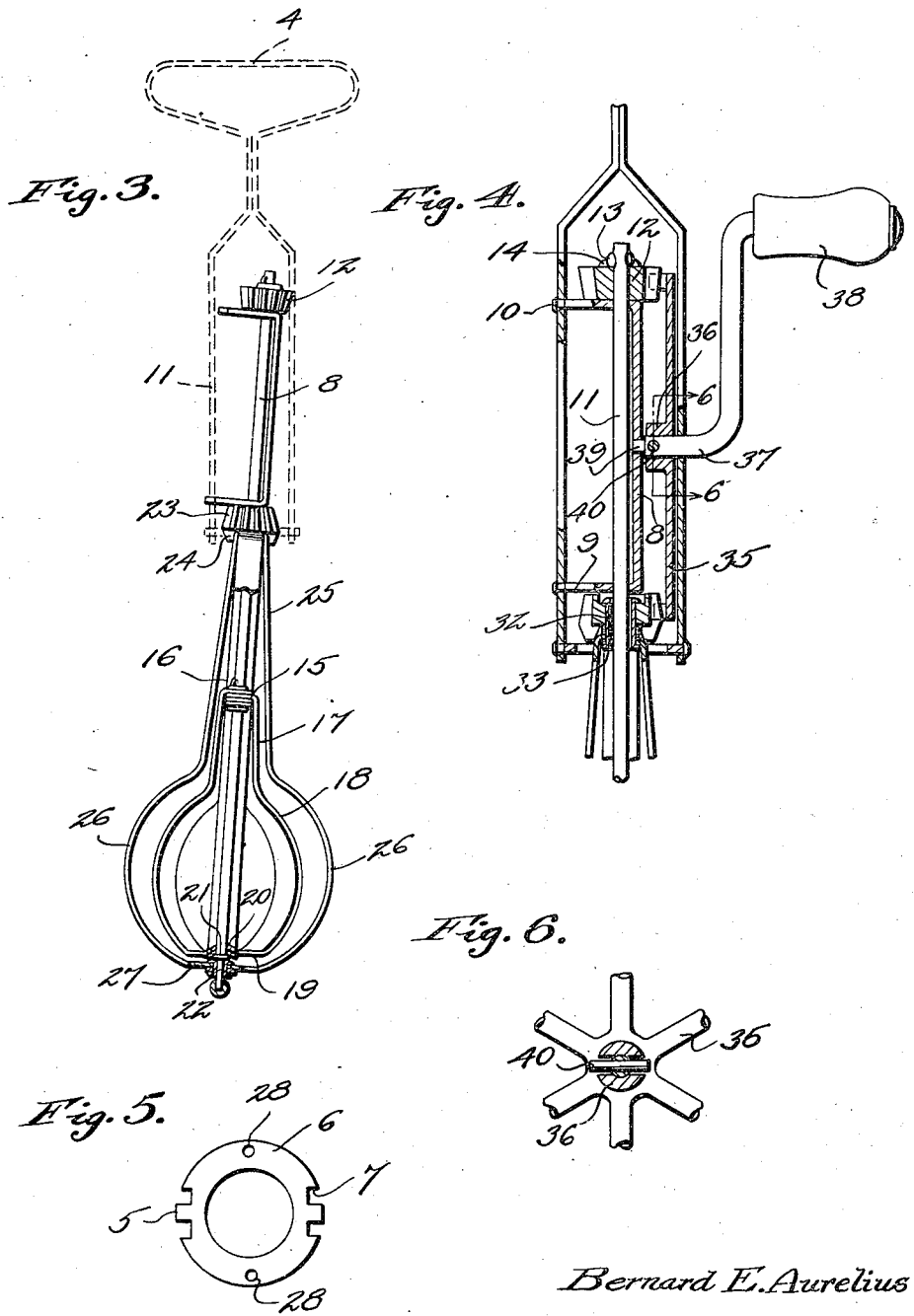

Patented Nov. 9, 1926.

1,606,684

UNITED STATES PATENT OFFICE.

BERNARD E. AURELIUS, OF BRAHAM, MINNESOTA, ASSIGNOR OF ONE-HALF TO EUGENE A. AURELIUS, OF BRAHAM, MINNESOTA.

BEATER.

Application filed March 10, 1926. Serial No. 93,783.

My present invention has reference to an egg beater or cream whipper and has for its object to provide a device of this class with two beater members, one revoluble in the other, but each turnable in an opposite direction and further wherein the beaters are enclosed by a suitable guard which permits of the device being arranged at varying desired angles in the operation thereof.

A still further object is to simplify and improve the existing art by producing an egg beater or cream whipper of an extremely simple construction so that the same may be cheaply manufactured and sold, and further wherein the parts constituting the same may be readily assembled in operative position or replaced should the same become worn or broken.

To the attainment of the foregoing, the invention consists in the improvement as hereinafter described and definitely claimed.

In the drawings:

Figure 1 is an elevation of the improvement.

Figure 2 is a similar view looking at right angles to the construction disclosed in Figure 1.

Figure 3 is a view to illustrate the manner in which the beater arms and the shafts therefor may be arranged in the frame of the improvement.

Figure 4 is an enlarged detail sectional view approximately on the line 4—4 of Figure 2.

Figure 5 is a plan view of the disc that provides the base of the frame.

Figure 6 is a detail sectional view approximately on the line 6—6 of Figure 4.

The frame of my improvement is formed from a single strip of suitable metal. The frame includes parallel side members 1—1, which at their inner ends are bent inwardly, as at 2, and from thence continued in contacting relation, as at 3. The parts 3 are bent outwardly and are rounded to the connecting element of the strip to provide the frame with a handle 4. One of the side members of the frame, at spaced intervals, is formed with transverse notches, and the frame adjacent to its outer ends is formed with similar notches. These last mentioned notches are designed to receive therein lugs 5 provided on the opposite edges of a disc 6, the disc being notched, as at 7, at the opposite sides of the lugs 5. The lugs 5 are slightly headed after passing through the mentioned lower openings in the arms 1 of the frame.

Designed to be received in the frame there is a combined spacing and bearing member, the same being also formed from a single strip of suitable metal to include a straight body portion 8 having angle arms 9 extending in the same direction, the said arms 9 having their outer ends reduced to form lugs 10 which are received in the first mentioned openings in the arm of the frame. These lugs 10 are also slightly headed for holding the member 8 in the frame. The arms 9 of the member 8 each have an aligning opening therethrough for the reception of a shaft 11. On the outer end of this shaft there is fixed a beveled pinion 12. The shaft is preferably indented from points adjacent to the respective opposite sides thereof to form outwardly extending lugs 13 and these lugs are received in notches 14 in the hub portion of the pinion 12. The shaft 11 has fixed on its outer end the reduced upper connecting element for the inner beater member. This beater is formed of two strips of suitable metal which have their referred to ends, indicated by the numeral 15, arranged in lapping relation and secured on the shaft preferably by forming the said shaft with lugs 16, similar to the lugs 13. From their angle ends 15 the inner beaters are provided with parallel depending arms 17, arranged, of course, right angularly with respect to each other and from thence rounded outwardly, as at 18, and upwardly, as at 19 in the usual manner. The shaft passes through openings in the ends 19 of the beaters, and the said ends have fixed thereto, preferably by bending the portions thereof that surround the openings through which the shafts pass into tight frictional engagement with the said shaft, as indicated by the numeral 20. The shaft, at the portion thereof arranged between the right angularly disposed portions 19 of the inner beater members is preferably formed with a flange 21 and from the said flange the shaft is reduced, as at 22.

Loosely arranged on the shaft and normally in slight contacting engagement with the lower arm 19 of the frame, there is a second pinion 23. This pinion has depending ears 24 which contact with the angle arms 25 of one of the members that comprise the outer beater. The outer beater is also provided with four arms or blades arranged rightangularly with respect to each other, the arms 25 of the said outer beaters having rounded portions 26 that surround the rounded portions 18 of the inner beaters, while the inwardly directed ends 27 at the said rounded portions of the said outer beaters receive the reduced end 22 of the shaft 17 therethrough. It is, of course to be understood that the outer beaters are simply journaled on and do not revolve with the shaft 11.

The disc 6 that provides the base of the frame, at right angles with respect to the tongues 5, has rounded openings 28 therethrough and these openings receive therethrough and have headed on the inner face of the said disc the arms 29 of a guard 30. The lower portion of the guard is rounded outwardly to surround both the rounded portions of both the inner and outer beaters, and the lower end 31 of the guard has an opening that receives therein the reduced end of the shaft 11.

With a construction as above described and by reference to Figure 3 of the drawings it will be noted that the guard, the beater arms, the shaft and the bearing and spacing member 8, together with the pinions on the shaft may be passed through the disc 6 prior to the passage of the lugs 10 on the ends of the arms 9 entering the notches in the frame. Also in order to reduce the friction between parts I arrange in the bore of the pinion 13 a bearing sleeve 32 through which the shaft 11 passes, the said sleeve having its lower end flanged, as at 33, to contact with the inner angle ends of the outer beater members. It should have been stated that the guard is not attached to the disc 6 when the parts are arranged as disclosed in Figure 3.

After the parts above described are properly assembled I arrange in the frame a crown gear wheel 35 which is in mesh with the pinions 12 and 23. The crown gear has an inwardly extended boss 36 that is notched. Passing through a bearing opening in the center of the arm 1 to which the lugs 10 are not attached there is the straight end 37 of a crank handle 38. The end 37 of the crank handle has a reduced extension 39 that is received in a bearing opening in the center of the member 8, and passing transversely through the said straight end 37 of the crank handle and received through the notch in the boss 36 there is a locking pin 40.

It is believed that the simplicity of my construction and the advantages thereof will be perfectly apparent to those skilled in the art to which the invention relates when the foregoing description is carefully read in connection with the accompanying drawings. By providing the inner and outer beaters with four separate and distinct beater blades, the material acted upon will be rapidly forced between the blades and separated and beaten to produce the desired result in a more expeditious manner than by the employment of any other construction with which I am acquainted. It will be further noted that the parts constituting the improvement may be cheaply constructed and may be readily assembled and replaced should any of the parts become worn or broken. While I have herein set forth a satisfactory embodiment of my invention as it now appears to me it is, of course, to be understood that I do not wish to be limited to the concise details of construction herein set forth and therefore hold myself entitled to such changes therefrom as fairly fall within the scope of what I claim without departing from or sacrificing any of the advantages of the improvement.

Having described the invention, I claim:—

1. In a device for the purpose set forth, a frame formed from a single strip of metal to include parallel arms, a shank and a handle formed at the end of the shank, an open bottom connecting the parallel arms of the frame, a bearing member of a size to be passed through the bottom of the frame and adapted to be attached to one arm of the frame, a shaft in the bearing member, inner and outer beaters, each of said beaters comprising a pair of rightangularly arranged strips whose outer ends are rounded outwardly, the outer ends of the inner beater being fixed to the shaft and the outer end of the shaft being journaled through the outer beaters and means for simultaneously revolving the beaters in opposite directions.

2. A frame for a beater of the class described, comprising a member formed from a strip of metal to include parallel arms, having angle portions provided with extensions which are disposed in contacting engagement, and which have their outer ends bent to form a substantially U-shaped handle and a notched disc which has lugs projecting centrally through the notches thereof, to engage in openings in the outer ends of the frame.

In testimony whereof I affix my signature.

BERNARD E. AURELIUS.